(12) United States Patent
Tanaka et al.

(10) Patent No.: US 9,546,673 B2
(45) Date of Patent: Jan. 17, 2017

(54) HYDRAULIC DRIVE SYSTEM

(71) Applicants: KABUSHIKI KAISHA KCM, Kako-gun, Hyogo (JP); KAWASAKI JUKOGYO KABUSHIKI KAISHA, Kobe-shi, Hyogo (JP)

(72) Inventors: Shinichiro Tanaka, Kakogawa (JP); Hiroyasu Kodera, Kobe (JP); Makoto Ito, Kobe (JP)

(73) Assignee: KABUSHIKI KAISHA KCM, Hyogo (JP)

(*) Notice: Subject to any disclaimer, the term of this patent is extended or adjusted under 35 U.S.C. 154(b) by 310 days.

(21) Appl. No.: 14/364,035

(22) PCT Filed: Nov. 30, 2012

(86) PCT No.: PCT/JP2012/007712
§ 371 (c)(1),
(2) Date: Jun. 9, 2014

(87) PCT Pub. No.: WO2013/084457
PCT Pub. Date: Jun. 13, 2013

(65) Prior Publication Data
US 2014/0366521 A1    Dec. 18, 2014

(30) Foreign Application Priority Data

Dec. 8, 2011   (JP) ................................. 2011-269294

(51) Int. Cl.
*F16D 31/02* (2006.01)
*F15B 21/00* (2006.01)
(Continued)

(52) U.S. Cl.
CPC ............. *F15B 21/001* (2013.01); *B62D 5/063* (2013.01); *E02F 9/225* (2013.01); *E02F 9/2228* (2013.01);
(Continued)

(58) Field of Classification Search
CPC ... F16H 61/4017; E02F 9/2221; E02F 9/2246; F01N 3/023; F01N 9/002
See application file for complete search history.

(56) References Cited

U.S. PATENT DOCUMENTS 6,769,348 B2 * 8/2004 Hudson ................. E02F 9/2221
60/452
8,161,736 B2 * 4/2012 Tsukada .................. F01N 9/002
60/286

(Continued)

FOREIGN PATENT DOCUMENTS

JP    A-2011-12606    1/2011

*Primary Examiner* — Michael Leslie
(74) *Attorney, Agent, or Firm* — Oliff PLC (57) ABSTRACT

A hydraulic drive system includes a pump, a steering actuator, a loading/unloading apparatus actuator, a drive device, a relief valve, and an input unit. The drive device: flows hydraulic oil from the pump to the loading/unloading apparatus actuator when an operating tool is operated; flows the hydraulic oil from the pump to the steering actuator when a steering has become an operated state from a non-operated state regardless of an operation of the operating tool; and causes the hydraulic oil from the pump to be discharged to a tank via the relief valve to increase the torque of an engine when an increase instruction is inputted to the input unit and the steering is in a non-operated state.

5 Claims, 3 Drawing Sheets

(51) Int. Cl.
*E02F 9/22* (2006.01)
*F15B 11/16* (2006.01)
*F15B 1/26* (2006.01)
*F16H 61/4017* (2010.01)
*B62D 5/06* (2006.01)
*F01N 3/023* (2006.01)

(52) U.S. Cl.
CPC ........... *E02F 9/2246* (2013.01); *E02F 9/2285* (2013.01); *F15B 1/26* (2013.01); *F15B 11/162* (2013.01); *F16H 61/4017* (2013.01); *F01N 3/023* (2013.01); *F01N 2590/08* (2013.01); *F15B 2211/20523* (2013.01); *F15B 2211/252* (2013.01); *F15B 2211/4053* (2013.01); *F15B 2211/428* (2013.01); *F15B 2211/6355* (2013.01); *F15B 2211/6658* (2013.01); *F15B 2211/67* (2013.01); *F15B 2211/7135* (2013.01); *F15B 2211/781* (2013.01); *F15B 2211/85* (2013.01)

(56) References Cited

U.S. PATENT DOCUMENTS

| | | | | |
|---|---|---|---|---|
| 8,756,930 B2* | 6/2014 | Johnson | ................ | E02F 9/2242 60/430 |
| 2010/0170227 A1* | 7/2010 | Tsukada | ................. | F01N 9/002 60/286 |
| 2012/0279203 A1* | 11/2012 | Arai | .................... | B01D 53/944 60/276 |
| 2014/0318116 A1* | 10/2014 | Ito | ......................... | B62D 5/065 60/422 |

* cited by examiner

HYDRAULIC DRIVE SYSTEM

TECHNICAL FIELD

The present invention relates to hydraulic drive systems capable of: flowing hydraulic oil from a pump to a steering actuator and a loading/unloading apparatus actuator, which are connected parallel to a pump, thereby causing these actuators to operate; and flowing the hydraulic oil to the steering actuator preferentially.

BACKGROUND ART

For construction machinery equipped with an engine, there is a technical problem to solve, which is to reduce particulate matter (which may hereinafter be simply referred to as PM) such as soot contained in exhaust gas discharged from the engine. In order solve the problem, the construction machinery includes, for example, filters in an exhaust gas pipe, a muffler, and the like. PM is collected by the filters, and then the exhaust gas is discharged to the atmosphere.

However, if PM is kept collected, then the PM builds up inside the filters, thereby clogging the filters. In order to suppress such clogging, it is necessary to remove the PM that has built up from the inside of the filters. One of the methods for removing PM is, for example, increasing the load torque of the engine to increase the temperature of the exhaust gas, thereby burning the PM to remove the PM. For example, Patent Literature 1 discloses a work machine that realizes such a PM removal method. The work machine disclosed in Patent Literature 1 is configured such that a controller controls the discharge flow rate of a pump, the discharge pressure of the pump, and an engine speed, thereby increasing the load torque of the engine to increase the temperature of the exhaust gas.

CITATION LIST

Patent Literature

PTL 1: Japanese Laid-Open Patent Application Publication No. 2011-12606

SUMMARY OF INVENTION

Technical Problem

In the work machine disclosed in Patent Literature 1, the controller controls a variable throttle valve to adjust the discharge pressure of the pump. However, since the discharge pressure of the pump changes in accordance with the degree of opening of the variable throttle valve and the flow rate from the pump, there are cases where the load torque of the engine becomes unstable due to the changes in the discharge pressure, and the temperature of the exhaust gas does not become a desired temperature. Although it is conceivable to perform feedback control to stabilize the load torque of the engine, in such a case, the control becomes complex and the number of components increases.

The work machine disclosed in Patent Literature 1 is applied to a system including a single hydraulic actuator or including a plurality of hydraulic actuators connected in series to the pump. Patent Literature 1 fails to disclose applying its structure to a system in which actuators such as a steering actuator and a loading/unloading apparatus actuator are connected parallel to the pump and the steering actuator is driven preferentially. If the structure disclosed in Patent Literature 1 is applied to a system in which actuators such as a steering actuator and a loading/unloading apparatus actuator are connected parallel to the pump, it is necessary to provide a variable throttle valve at both the steering side and the loading/unloading apparatus side. This results in an increase in the number of components. In addition, in order to flow hydraulic oil toward the steering preferentially, the control becomes complex. This also results in an increase in the number of components.

In view of the above, an object of the present invention is to provide a hydraulic drive system capable of effectively removing particulate matter that has built up in a filter and preferentially causing a steering to operate.

Solution to Problem

A hydraulic drive system according to the present invention is applied to construction machinery, the construction machinery including: a steering for steering a wheel; a loading/unloading apparatus; and an operating tool for operating the loading/unloading apparatus. The hydraulic drive system includes: a pump configured to be driven by an engine and discharge hydraulic oil; a steering actuator connected to the pump and configured to operate based on the hydraulic oil from the pump; a loading/unloading apparatus actuator connected to the pump in parallel with the steering actuator and configured to operate based on the hydraulic oil from the pump; a drive device configured to control a flow of the hydraulic oil from the pump in accordance with an operation of the operating tool and an operation of the steering; a relief valve configured to discharge the hydraulic oil from the pump to a tank when a discharge pressure of the pump has become a predetermined pressure or higher; and an input unit for inputting an increase instruction to increase a torque of the engine. The drive device: flows the hydraulic oil from the pump to the loading/unloading apparatus actuator when the operating tool is operated; flows the hydraulic oil from the pump to the steering actuator when the steering has become an operated state from a non-operated state regardless of an operation of the operating tool; and causes the hydraulic oil from the pump to be discharged to the tank via the relief valve to increase the torque of the engine when the increase instruction is inputted to the input unit and the steering is in a non-operated state.

According to the present invention, when the increase instruction is inputted to the input unit and the steering is rendered in a non-operated state, the hydraulic oil from the pump is discharged to the tank via the relief valve. By discharging the hydraulic oil via the relief valve in this manner, the hydraulic oil discharge pressure of the pump increases. Accordingly, the torque of the pump increases, which makes it possible to increase the load torque of the engine and the temperature of exhaust gas. Thus, particulate matter that has built up in a filter can be burned and thereby removed. In this manner, emission of particulate matter contained in the exhaust gas can be suppressed. When the discharge pressure of the pump has increased to the predetermined pressure or higher, the relief valve flows the hydraulic oil from the pump to the tank. In this manner, the discharge pressure of the pump can be kept to the predetermined pressure, and the load torque of the engine E can be stabilized.

Further, when the operating tool is operated, the hydraulic oil flows to the loading/unloading operation actuator, and when the steering has become an operated state from a non-operated state, the hydraulic oil flows to the steering actuator preferentially regardless of an operation of the operating tool. Therefore, when the steering is operated, the loading/unloading operation actuator can be stopped from operating and the steering actuator can be preferentially caused to operate.

Advantageous Effects of Invention

The present invention makes it possible to provide a hydraulic drive system capable of effectively removing particulate matter that has built up in a filter and configured to preferentially cause a steering to operate.

The above object, other objects, features, and advantages of the present invention will be made clear by the following detailed description of preferred embodiments with reference to the accompanying drawings.

DESCRIPTION OF EMBODIMENTS

Hereinafter, hydraulic drive systems 1, 1A, and 1B according to embodiments of the present invention are described with reference to the drawings. Directions mentioned in the embodiments below are directions seen from an operator of a wheel loader described below, and are used for the sake of convenience of the description, but do not limit the directions of each component. It should be noted that the hydraulic drive systems 1, 1A, and 1B described below are merely embodiments of the present invention. The present invention is not limited to these embodiments, and additions, deletions, and modifications can be made to the embodiments without departing from the spirit of the present invention.

Embodiment 1

The hydraulic drive system 1 according to Embodiment 1 of the present invention is included in construction machinery, for example, a wheel loader. The wheel loader includes a loading/unloading apparatus, for example, a bucket and hoist. The wheel loader is configured to scoop up earth and sand, stones and rocks, and the like by operating the bucket, and lift the bucket by operating the hoist. The wheel loader with such a configuration is configured to bend its body and operate the bucket and hoist by means of the hydraulic drive system 1.

Figure 1:
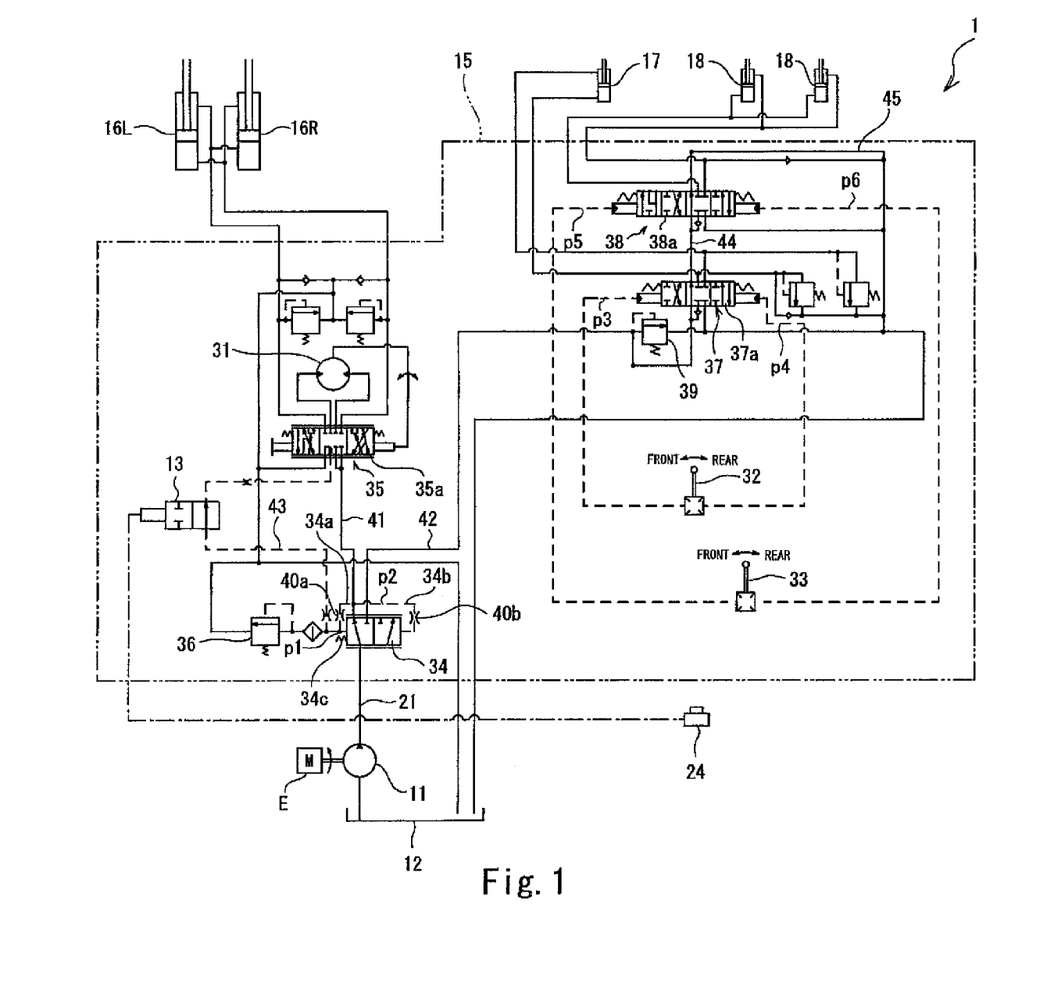
FIG. 1 is a circuit diagram showing a hydraulic circuit of a hydraulic drive system according to Embodiment 1 of the present invention.

As shown in FIG. 1, fundamentally, the hydraulic drive system 1 includes a hydraulic pump 11, a tank 12, a drive device 15, steering actuators 16L and 16R, a bucket actuator 17, and two hoist actuators 18. The hydraulic pump 11 is a fixed displacement pump, and is connected to an output shaft of an engine E via a gear mechanism. When the engine E is driven and the output shaft is rotated, the hydraulic pump 11 takes in hydraulic oil stored in the tank 12, compresses, and discharges the hydraulic oil. The hydraulic pump 11 includes a discharge port connected to a main passage 21. The drive device 15 is connected to the main passage 21.

The drive device 15 is configured to flow the hydraulic oil to the steering actuators 16L and 16R, the bucket actuator 17, and the hoist actuators 18 in accordance with operations of a steering device 31, a bucket-operating lever 32, and a hoist-operating lever 33, thereby driving these actuators 16L, 16R, 17, and 18. The drive device 15 is configured such that, when the steering device 31 is operated, the drive device 15 flows the hydraulic oil preferentially to the steering actuators 16L and 16R to drive the steering actuators 16L and 16R preferentially.

Further, in a state where the steering device 31, the bucket-operating lever 32, and the hoist-operating lever 33 are not operated, the drive device 15 connects the main passage 21 to the tank 12 to cause the hydraulic oil from the hydraulic pump 11 to return to the tank 12. Hereinafter, a specific configuration of the drive device 15 is described.

The drive device 15 includes a priority valve 34, a steering direction control valve 35, a steering-side relief valve 36, a solenoid switching valve 13, a bucket direction control valve 37, a hoist direction control valve 38, and a loading/unloading apparatus-side relief valve 39. The priority valve 34 is connected to the main passage 21, and also to a steering-side main passage 41 and a loading/unloading apparatus-side main passage 42. The priority valve 34 is a pilot-type switching valve, and includes first and second pilot passages 34a and 34b through which to apply two pilot pressures p1 and p2, which are exerted against each other. The hydraulic pressure in the steering-side main passage 41 is guided to the two pilot passages 34a and 34b via throttles 40a and 40b. The priority valve 34 includes a spring member 34c configured to exert urging force against the second pilot pressure p2. In accordance with the urging force of the spring member 34c and equilibrium between the two pilot pressures p1 and p2, the connection destination of the main passage 21 is switched between the steering-side main passage 41 and the loading/unloading apparatus-side main passage 42. The steering direction control valve 35 is connected to the steering-side main passage 41.

The steering direction control valve 35 is connected to the pair of steering actuators 16L and 16R, and is configured to control the flow direction of the hydraulic oil that is flowed to the pair of steering actuators 16L and 16R. The pair of steering actuators 16L and 16R is a so-called cylinder mechanism. The steering actuators 16L and 16R are disposed at the left side and the right side, respectively, in such a manner as to span between a rear chassis and a front chassis. The advancing direction of the wheel loader can be changed to the right by expanding the left-side steering actuator 16L and contracting the right-side steering actuator 16R. Similarly, the advancing direction of the wheel loader can be changed to the left by expanding the right-side steering actuator 16R and contracting the left-side steering actuator 16R.

The steering direction control valve 35 includes a spool 35a, and is configured such that the position of the spool 35a can be changed by the steering device 31. Specifically, by turning the steering of the steering device 31 to the left and right, the spool 35a is moved from a neutral position to a first offset position and a second offset position, respectively. The steering direction control valve 35 is configured to change the flow direction of the hydraulic oil by moving the spool 35a.

That is, while the spool 35a is located at the neutral position, the steering-side main passage 41 and the pair of steering actuators 16L and 16R are blocked from each other, and the expansion/contraction state of the pair of steering actuators 16L and 16R is maintained. When the steering is turned to the left to move the spool 35a to the first offset position, the hydraulic oil flows in such a manner as to cause the left-side steering actuator 16L to contract and cause the right-side steering actuator 16R to expand. When the steering is turned to the right to move the spool 35a to the second offset position, the hydraulic oil flows in such a manner as to cause the right-side steering actuator 16R to contract and cause the left-side steering actuator 16L to expand.

A communication passage 43 is connected to the steering direction control valve 35. The solenoid switching valve 13 is disposed in the communication passage 43. The solenoid switching valve 13, which is a direction switching valve, is connectable to the communication passage 43, and is electrically connected to an operating button 24. The operating button 24 is configured to output an instruction in accordance with an operation performed thereon. The solenoid switching valve 13 opens or closes the communication passage 43 in accordance with the instruction.

The communication passage 43 opened and closed by the solenoid switching valve 13 in such a manner is connected to the first pilot passage 34a of the priority valve 34, and when the steering direction control valve 35 is not in operation, connected to the tank 12. As a result of the communication passage 43 being connected to the tank 12, the first pilot pressure p1 becomes lower than the second pilot pressure p2, and the priority valve 34 connects the main passage 21 to the loading/unloading apparatus-side main passage 42. On the other hand, when the steering direction control valve 35 has operated, the communication passage 43 previously connected to the tank 12 is connected to the steering-side main passage 41. As a result, the pressure in the steering-side main passage 41 flows to the communication passage 43 as LS pressure, causing an increase in the pilot pressure p1, and the priority valve 34 connects the main passage 21 to the steering-side main passage 41.

The steering-side relief valve 36 is connected to the communication passage 43. When the pilot pressure p1 has increased to a predetermined pressure, the hydraulic oil is discharged from the steering-side relief valve 36 to the tank 12. Accordingly, the circuit pressure of the steering-side main passage 41 will not exceed the predetermined pressure. The bucket direction control valve 37 is connected to the loading/unloading apparatus-side main passage 42.

The bucket direction control valve 37 is connected to the bucket actuator 17, and is configured such that, in accordance with pilot pressures p3 and p4 which are outputted in response to operations of the bucket-operating lever 32 in the front-rear direction, the bucket direction control valve 37 switches the flow direction of the hydraulic oil that is flowed to the bucket actuator 17. The bucket actuator 17 is a so-called cylinder mechanism, and is configured to expand and contract in accordance with the flow direction of the hydraulic oil that is flowed to the bucket actuator 17. The bucket actuator 17 is configured to expand or contract, thereby raising or tilting the bucket.

The bucket direction control valve 37 thus configured is an open-center control valve connected to a hoist passage 44. The bucket direction control valve 37 is configured to connect between the loading/unloading apparatus-side main passage 42 and the hoist passage 44 when a spool 37a of the bucket direction control valve 37 is located at a neutral position, thereby flowing the hydraulic oil from the hydraulic pump 11 to the hoist passage 44. At an offset position where the spool 37a is located when the bucket-operating lever 32 is operated, the loading/unloading apparatus-side main passage 42 is connected to the bucket actuator 17 such that the hydraulic oil from the hydraulic pump 11 flows to the bucket actuator 17. At the time, the hoist passage 44 and the loading/unloading apparatus-side main passage 42 are blocked from each other. The hoist direction control valve 38 is connected to the hoist passage 44.

The hoist direction control valve 38 is connected to the pair of hoist actuators 18, and is configured such that, in accordance with pilot pressures p5 and p6 which are outputted in response to operations of the hoist-operating lever 33 in the front-rear direction, the hoist direction control valve 38 switches the flow direction of the hydraulic oil that is flowed to the pair of hoist actuators 18. The pair of hoist actuators 18 is a so-called cylinder mechanism, and is configured to expand and contract in accordance with the flow direction of the hydraulic oil that is flowed to the pair of hoist actuators 18. The bucket is configured to move upward or downward in accordance with the expansion and contraction of the pair of hoist actuators 18.

The hoist direction control valve 38 thus configured is an open-center control valve connected to a tank passage 45. The hoist direction control valve 38 is configured to connect between the hoist passage 44 and the tank passage 45 when a spool 38a of the hoist direction control valve 38 is located at a neutral position, thereby flowing the hydraulic oil from the hydraulic pump 11 to the tank passage 45. At an offset position where the spool 38a is located when the hoist-operating lever 33 is operated, the hoist passage 44 is connected to the pair of hoist actuators 18 such that the hydraulic oil from the hydraulic pump 11 flows to the pair of hoist actuators 18. At the time, the hoist passage 44 and the tank passage 45 are blocked from each other. The tank passage 45 is connected to the tank 12.

The loading/unloading apparatus-side relief valve 39 is provided in such a manner as to connect the tank passage 45 and the loading/unloading apparatus-side main passage 42. The loading/unloading apparatus-side relief valve 39 is configured to open when the pressure of hydraulic oil flowing through the loading/unloading apparatus-side main passage 42 has become a third predetermined pressure or higher, and thereby the hydraulic oil in the loading/unloading apparatus-side main passage 42 is discharged to the tank 12 through the tank passage 45.

[Operation of Hydraulic Drive System]

In the hydraulic drive system 1 with the above-described configuration, when the engine E is driven, the hydraulic oil is discharged from the hydraulic pump 11 to the main passage 21 and flows to the priority valve 34. In a state where none of the operating units (i.e., none of the steering and the levers 32 and 33) is operated, the priority valve 34 connects the main passage 21 to the loading/unloading apparatus-side main passage 42, and thereby the discharged hydraulic oil is guided to the loading/unloading apparatus-side main passage 42. The loading/unloading apparatus-side main passage 42 is connected to the tank 12. Accordingly, the discharged hydraulic oil is directly returned to the tank 12. That is, the hydraulic pump 11 is in an unloaded state.

In the unloaded state, when the bucket-operating lever 32 or the hoist-operating lever 33 is operated, the corresponding direction control valve 37 or 38 switches the flow direction of the hydraulic oil, and the corresponding actuator(s) 17 or 18 operates. As a result, the bucket or hoist moves. On the other hand, when the steering is operated from a non-operated state, the steering device 31 operates. As a result, the steering direction control valve 35 blocks between the first pilot passage 34a and the tank 12, and the priority valve 34 connects the main passage 21 to the steering-side main passage 41. Since the main passage 21 is thus connected to the steering-side main passage 41, the hydraulic oil discharged from the hydraulic pump 11 is guided to the steering-side main passage 41 regardless of operations of the levers 32 and 33. That is, the hydraulic oil is guided to the steering-side main passage 41 preferentially, and if the flow rate of the discharged hydraulic oil exceeds a flow rate necessary for the steering actuators 16L and 16R, the surplus hydraulic oil flows to the loading/unloading apparatus-side main passage 42. Then, the steering direction control valve 35 causes the hydraulic oil guided to the steering-side main passage 41 to flow in a flow direction corresponding to a steering operation, and thereby the pair of steering actuators 16L and 16R is caused to operate. In this manner, the front chassis can be bent to the left or right relative to the rear chassis, and thereby the advancing direction of the wheel loader can be changed.

In the hydraulic drive system 1 operating in the above-described manner, the load torque of the engine E can be increased in order to remove particulate matter (which may hereinafter be simply referred to as PM) such as soot building up inside a filter in an exhaust gas pipe of the engine E. Hereinafter, the steps of increasing the load torque of the engine E to remove the particulate matter are described.

First, when the operating button 24 is operated, the communication passage 43 is closed by the solenoid on-off valve 13. In a state where no operation of the steering is made, the first pilot pressure p1 increases as a result of the communication passage 43 being closed, and the priority valve 34 switches the connection destination of the main passage 21 from the loading/unloading apparatus-side main passage 42 to the steering-side main passage 41. As a result of the main passage 21 being connected to the steering-side main passage 41, the hydraulic oil flows toward the steering direction control valve 35. However, since the downstream side of the steering-side main passage 41 is blocked by the steering direction control valve 35, the circuit pressure of the steering-side main passage 41 increases. In accordance with the increase in the circuit pressure, the first pilot pressure p1 also increases. When the first pilot pressure p1 exceeds a predetermined pressure, the steering-side relief valve 36 is opened and the hydraulic oil is relieved. At the time, the steering-side relief valve 36 relieves the hydraulic oil in an amount that does not correspond to the discharge flow rate from the hydraulic pump 11 but corresponds to a pressure difference between the first pilot pressure p1 and the second pilot pressure p2. Part of the hydraulic oil flowing from the priority valve 34 flows toward the loading/unloading apparatus-side main passage 42. In this state, the discharge pressure of the hydraulic pump 11 is always kept to a predetermined pressure, and the engine E is controlled at the maximum torque. Therefore, the temperature of exhaust gas can be increased, and thereby PM can be removed.

The hydraulic drive system 1 is configured such that, even while the operating button 24 is being operated to increase the load torque of the engine E, if the steering is operated to cause the steering device 31 to operate, the hydraulic oil in the steering-side main passage 41 flows to the steering actuators 16L and 16R. Therefore, regardless of the operation of the operating button 24, the steering actuators can be caused to operate and the advancing direction of the wheel loader can be changed. The hydraulic drive system 1 utilizes an existing relief valve provided on the steering-side main passage 41. This makes it possible to increase the load torque of the engine while suppressing an increase in the number of components.

Embodiment 2

The configuration of the hydraulic drive system 1A according to Embodiment 2 of the present invention is similar to that of the hydraulic drive system 1 according to Embodiment 1. Therefore, the configuration of the hydraulic drive system 1A according to Embodiment 2 is described below with a focus on its differences from the configuration of the hydraulic drive system 1 according to Embodiment 1, and the description of the same configuration as that of the hydraulic drive system 1 according to Embodiment 1 is omitted. The same is true of the hydraulic drive system 1B according to Embodiment 3, which will be described below.

Figure 2:
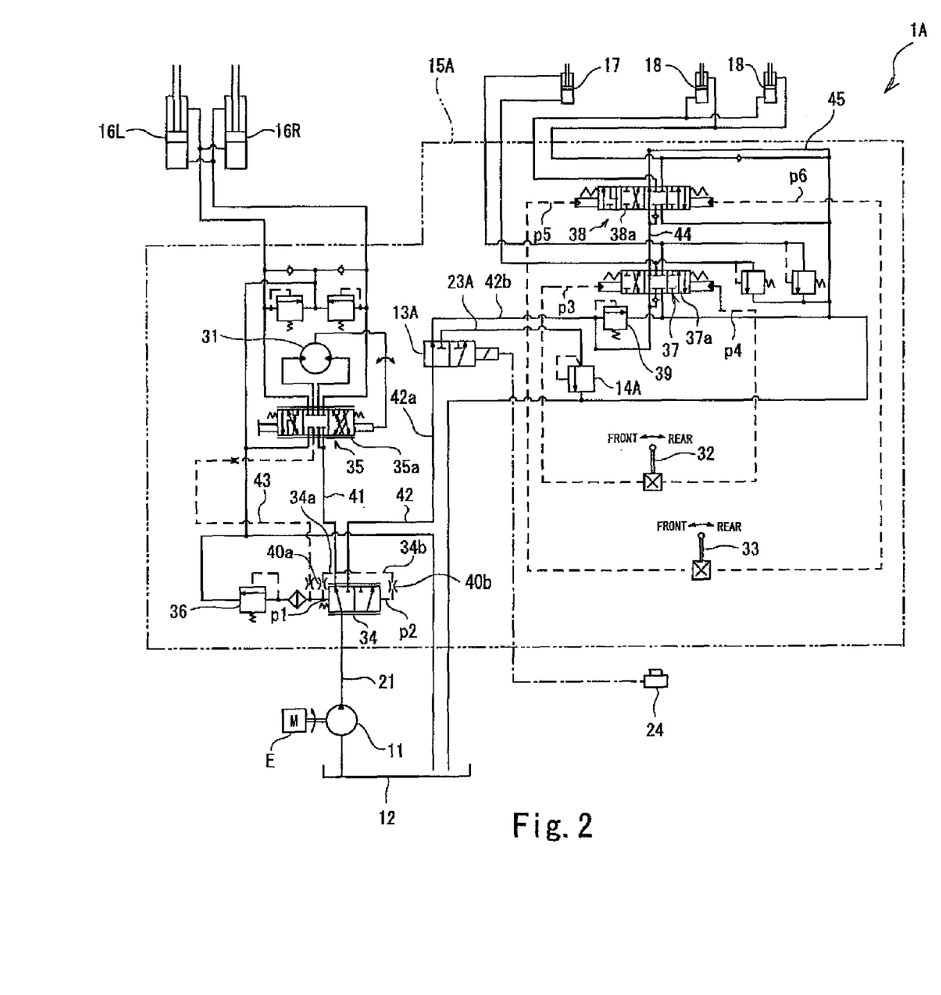
FIG. 2 is a circuit diagram showing a hydraulic circuit of a hydraulic drive system according to Embodiment 2 of the present invention.

As shown in FIG. 2, in a drive device 15A of the hydraulic drive system 1A, a solenoid switching valve 13A is disposed in the loading/unloading apparatus-side main passage 42. The solenoid switching valve 13A, which serves as a direction switching valve, is also connected to a relief passage 23A. The solenoid switching valve 13A is configured to switch the connection destination of a portion 42a of the loading/unloading apparatus-side main passage 42. The portion 42a is positioned upstream from the solenoid switching valve 13A (hereinafter, the portion 42a may be referred to as an "upstream portion 42a"). The solenoid switching valve 13A switches the connection destination of the portion 42a between a portion 42b of the loading/unloading apparatus-side main passage 42 and the relief passage 23A. The portion 42b is positioned downstream from the solenoid switching valve 13A (hereinafter, the portion 42b may be referred to as a "downstream portion 42b"). The operating button 24 is electrically connected to the solenoid switching valve 13A. The solenoid switching valve 13A is configured to switch the connection destination in accordance with an instruction from the operating button 24. The relief passage 23A is provided with a boosting relief valve 14A. The relief passage 23A is connected to the tank 12 via the boosting relief valve 14A.

In the hydraulic drive system 1A with the above-described configuration, similar to the hydraulic drive system 1 according to Embodiment 1, when the lever 32 or 33 is operated, the bucket actuator 17 or the hoist actuators 18 operate, and when the steering is operated, the steering actuators 16R and 16L operate preferentially. Similar to the hydraulic drive system 1 according to Embodiment 1, the hydraulic drive system 1A is configured such that, by operating the operating button 24, the load torque of the engine E can be increased. Hereinafter, the steps of increasing the load torque of the engine E are described in detail.

In the hydraulic drive system 1A, in a state where no operation of the steering is made, the main passage 21 and the loading/unloading apparatus-side main passage 42 are connected via the priority valve 34. In this state, when the operating button 24 is operated, the solenoid switching valve 13A blocks a connection between the hydraulic pump 11 and the tank 12, the connection being made via the hoist passage 44 and the tank passage 45. As a result, the hydraulic pressure in the upstream portion 42a increases, and also, the discharge pressure of the hydraulic pump 11 connected to the upstream portion 42a via the priority valve 34 and the main passage 21 increases, causing an increase in the load torque of the engine E. Accordingly, the temperature of exhaust gas discharged from the engine E increases, and thereby PM that builds up inside the filter in the exhaust gas pipe of the engine E can be removed. If the hydraulic pressure in the upstream portion 42a has increased to a first predetermined pressure or higher, the boosting relief valve 14A is opened and the hydraulic oil in the relief passage 23A is discharged to the tank 12. Accordingly, the hydraulic pressure in the upstream portion 42a and the discharge pressure are kept to the first predetermined pressure, and the load torque of the engine E can be controlled at the maximum value.

Further, in the hydraulic drive system 1A according to Embodiment 2, similar to the hydraulic drive system 1 according to Embodiment 1, even while the operating button 24 is being operated to increase the load torque of the engine E, the steering actuators 16L and 16R can be caused to operate by operating the steering, and thereby the advancing direction of the wheel loader can be changed. Meanwhile, the solenoid switching valve 13A prevents the hydraulic oil from flowing to the downstream portion 42b while the operating button 24 is being operated to increase the load torque of the engine E. Therefore, while the operating button 24 is being operated to increase the load torque of the engine E, even if undesirable operations of the levers 32 and 33 are made, the loading/unloading apparatus can be prevented from operating.

Other than the above, the hydraulic drive system 1A according to Embodiment 2 provides the same functional advantages as those provided by the hydraulic drive system 1 according to Embodiment 1.

Another Embodiment

The configuration of the hydraulic drive system 1B according to another embodiment is slightly different from the configuration of the hydraulic drive system 1 according to Embodiment 1. As with the description of Embodiment 2, the description below is given with a focus on the differences from the configuration of the hydraulic drive system 1 according to Embodiment 1, and the description of the same configuration as that of the hydraulic drive system 1 according to Embodiment 1 is omitted.

Figure 3:
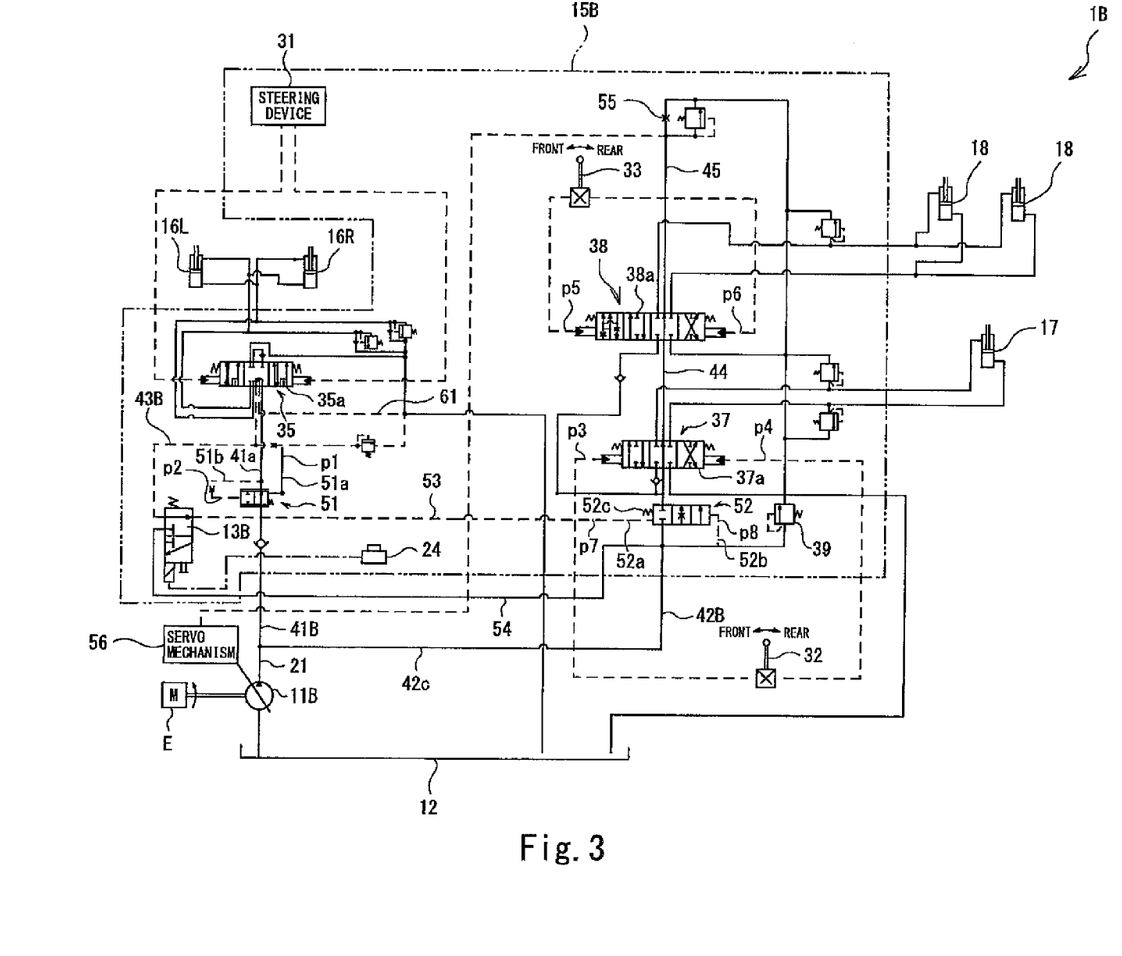
FIG. 3 is a circuit diagram showing a hydraulic circuit of a hydraulic drive system according to another embodiment of the present invention.

As shown in FIG. 3, in the hydraulic drive system 1B according to said another embodiment, the main passage 21 is directly connected to a steering-side main passage 41B and a loading/unloading apparatus-side main passage 42B. A meter-in compensator 51 is disposed in the steering-side main passage 41B, and a bleed-off compensator 52 is disposed in the loading/unloading apparatus-side main passage 42B.

The meter-in compensator 51, which is a first switching valve, is a pilot-type on-off valve including two pilot passages 51a and 51b. The meter-in compensator 51 is configured to switch its opened state and closed state in accordance with a pressure difference between the first and second pilot pressures p1 and p2. The first pilot passage 51a is connected to the steering direction control valve 35 via a communication passage 43B. The bleed-off compensator 52, which is a second switching valve, is a pilot-type flow control valve including two pilot passages 52a and 52b. The bleed-off compensator 52 is configured to control the flow rate of the hydraulic oil that flows through the bleed-off compensator 52 in accordance with a pressure difference between seventh and eighth pilot pressures p7 and p8. The seventh pilot passage 52a is connected to the communication passage 43B via a first bypass passage 53, and the first pilot pressure p1 is guided to the seventh pilot passage 52a. On the other hand, the eighth pilot passage 52b is connected to a portion of the loading/unloading apparatus-side main passage 42B, the portion being positioned upstream from the bleed-off compensator 52 (hereinafter, the portion may be simply referred to as an "upstream portion").

In the hydraulic drive system 1B with the above-described configuration, a tank line 61, which is connected to the tank 12, and the communication passage 43B come into communication with each other in the spool 35a when the spool 35a of the steering direction control valve 35 is located at the neutral position, and thereby the first pilot pressure p1 exerted on the meter-in compensator 51 becomes equal to the tank pressure. On the other hand, the second pilot passage 51b is connected to a portion 41a of the steering-side main passage 41B. The portion 41a is positioned downstream from the meter-in compensator 51 (hereinafter, the portion 41a may be referred to as a "downstream portion 41a"). The discharge pressure from the hydraulic pump 11 is supplied to the portion 41a. Accordingly, the second pilot pressure p2 becomes the discharge pressure from the hydraulic pump 11, and the meter-in compensator 51 on which the second pilot pressure p2 is exerted is moved in such a direction as to close the steering-side main passage 41B. As a result, the steering-side main passage 41B is closed.

When the spool 35a of the steering direction control valve 35 has moved to the first or second offset position, the communication passage 43B connected to the tank line 61 in the spool 35a is blocked from the tank line 61. That is, the communication passage 43B and the tank 12 are blocked from each other. Meanwhile, the connection between the communication passage 43B and the downstream portion 41a is maintained. As a result, the first and second pilot pressures p1 and p2 become substantially equal to each other, and the meter-in compensator 51, which is urged by spring force, is moved in such a direction as to open the steering-side main passage 41B. Since the connection between the communication passage 43B and the downstream portion 41a is maintained, the pressure in the communication passage 43B and the pressure p7 in the seventh pilot passage 52a of the bleed-off compensator 52 increase, and the bleed-off compensator 52 blocks or narrows down the loading/unloading apparatus-side main passage 42B. As a result, the hydraulic oil in an amount corresponding to the discharge flow rate of the pump 11 is preferentially flowed to the meter-in compensator 51, and thus the hydraulic oil is supplied to the steering actuators 16L and 16R.

When the spool 35a returns to the neutral position again, the pressure in the communication passage 43B is reduced to the tank pressure, and the meter-in compensator 51 blocks the steering-side main passage 41B. As a result, the pressure in the seventh pilot passage 52a connected to the communication passage 43B via the first bypass passage 53 becomes the tank pressure and the bleed-off compensator 52 is opened, and the hydraulic oil in an amount corresponding to the discharge flow rate of the pump 11 is entirely supplied to the loading/unloading apparatus. A solenoid switching valve 13B is disposed in the first bypass passage 53.

The solenoid switching valve 13B is connected to a second bypass passage 54, and is configured to switch the connection destination of the seventh pilot passage 52a between the communication passage 43B and the second bypass passage 54. The operating button 24 is electrically connected to the solenoid switching valve 13B. The solenoid switching valve 13B is configured to switch the connection destination in accordance with an instruction that is outputted in response to an operation of the operating button 24. The second bypass passage 54 is connected to the loading/unloading apparatus-side main passage 42B. Therefore, when the solenoid switching valve 13B has switched the connection destination of the seventh pilot passage 52a from the communication passage 43B to the second bypass passage 54, the seventh and eighth pilot pressures p7 and p8 of the bleed-off compensator 52 become substantially the same, and the loading/unloading apparatus-side main passage 42B is forcibly closed by the spring force of a spring 52c, the spring force being exerted on the bleed-off compensator 52, so that the hydraulic pump 11B and the tank 12 are blocked from each other.

A throttle 55 is disposed in the tank passage 45 which connects the hydraulic pump 11B and the tank 12. The throttle 55 is configured to generate pressure at the upstream side of the throttle 55, the pressure being exerted on the hydraulic oil that returns to the tank 12 through the tank passage 45. The hydraulic pump 11B is a so-called variable displacement pump, and includes a servo mechanism 56. The servo mechanism 56 is configured to change the discharge flow rate of the hydraulic pump 11B in accordance with the pressure at the upstream side of the throttle 55. Specifically, the servo mechanism 56 is configured to reduce the discharge capacity when the pressure at the upstream side of the throttle 55 is high, and increases the discharge capacity when the pressure at the upstream side of the throttle 55 is low.

Similar to the hydraulic drive systems 1 and 1A according to Embodiments 1 and 2, the hydraulic drive system 1B with the above-described configuration is configured such that, by operating the operating button 24, the load torque of the engine E can be increased. A specific description of the steps of increasing the load torque of the engine E is given below. First, the operating button 24 is operated, and thereby the connection destination of the seventh pilot passage 52a is switched from the communication passage 43B to the second bypass passage 54 by means of the solenoid switching valve 13B. As a result, the loading/unloading apparatus-side main passage 42B is forcibly closed by the bleed-off compensator 52, and thereby the hydraulic pump 11B and the tank 12 are blocked from each other. Consequently, the hydraulic oil is prevented from being guided to the throttle 55, and the servo mechanism 56 increases the discharge amount of the hydraulic pump 11B to the maximum flow rate. On the other hand, in a state where the steering device 31 is not in operation, the steering-side main passage 41B is also in a state of being closed by the meter-in compensator 51. Accordingly, the discharge pressure of the hydraulic pump 11B increases.

Thus, by increasing the discharge amount of the hydraulic pump 11B to the maximum flow rate and increasing the discharge pressure, the load torque of the engine E increases, and the temperature of exhaust gas discharged from the engine E increases. Accordingly, PM that builds up inside the filter in the exhaust gas pipe of the engine E can be removed. It should be noted that if the hydraulic pressure in the loading/unloading apparatus-side main passage 42B has increased to the third predetermined pressure or higher, the loading/unloading apparatus-side relief valve 39 is opened, and the hydraulic oil in the loading/unloading apparatus-side main passage 42B is discharged to the tank 12. Accordingly, the pressure in the loading/unloading apparatus-side main passage 42B and the discharge pressure are kept to the third predetermined pressure, and the load torque of the engine E can be controlled at the maximum value.

In this state, if the steering device 31 is operated, then the steering-side main passage 41B is opened by the meter-in compensator 51. As a result, the hydraulic oil is supplied from the pump 11B to the steering actuators 16L and 16R. Thus, even while the load torque of the engine E is being increased, the steering actuators 16L and 16R can be caused to operate.

Other than the above, the hydraulic drive system 1B according to said another embodiment provides the same functional advantages as those provided by the hydraulic drive systems 1 and 1A according to Embodiments 1 and 2.

Other Embodiments

The hydraulic drive system 1 according to Embodiment 1, which includes the solenoid on-off valve 13, may further include the solenoid switching valve 13A and the boosting relief valve 14A of Embodiment 2. With such a configuration, even if undesirable operations of the levers 32 and 33 are made while the load torque of the engine E is being increased, the loading/unloading apparatus can be prevented from operating. Further, although Embodiments 1 and 2 adopt the fixed displacement hydraulic pump 11, Embodiments 1 and 2 may alternatively adopt the variable displacement hydraulic pump 11B as in said another embodiment. Still further, the number of hydraulic pumps 11 is not limited to one but may be two or more. Still further, the connection of the hydraulic pump 11 to the engine E need not be made via the gear mechanism, but may be made via fluid coupling or the like. Still further, the hydraulic pump 11 and the engine E may be directly connected to each other. Still further, the hydraulic pump 11B may additionally have a torque control function. By controlling the torque of the hydraulic pump 11B as intended, the torque of the engine E can be set to an intended torque.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The structural and/or functional details may be substantially altered without departing from the spirit of the present invention.

REFERENCE SIGNS LIST 1, 1A, 1B hydraulic drive system
11, 11B hydraulic pump
12 tank
13 solenoid on-off valve
13A, 13B solenoid switching valve
14A boosting relief valve
15 drive device
16L steering actuator
16R steering actuator
17 bucket actuator
18 hoist actuator
31 steering device
32 bucket-operating lever
33 hoist-operating lever
34 priority valve
35 steering direction control valve
36 steering-side relief valve
37 bucket direction control valve
38 hoist direction control valve
39 loading/unloading apparatus-side relief valve
51 meter-in compensator
52 bleed-off compensator

The invention claimed is:

1. A hydraulic drive system to be applied to construction machinery, the construction machinery including: a steering for steering a wheel; a loading/unloading apparatus; and an operating tool for operating the loading/unloading apparatus, the hydraulic drive system comprising:
a pump configured to be driven by an engine and discharge hydraulic oil;
a steering actuator connected to the pump and configured to operate based on the hydraulic oil from the pump;
a loading/unloading apparatus actuator connected to the pump in parallel with the steering actuator and configured to operate based on the hydraulic oil from the pump;
a drive device configured to control a flow of the hydraulic oil from the pump in accordance with an operation of the operating tool and an operation of the steering;
a relief valve configured to discharge the hydraulic oil from the pump to a tank when a discharge pressure of the pump has become a predetermined pressure or higher; and
an input unit for inputting an increase instruction to increase a torque of the engine, wherein
the drive device:
flows the hydraulic oil from the pump to the loading/unloading apparatus actuator when the operating tool is operated;
flows the hydraulic oil from the pump to the steering actuator when the steering has become an operated state from a non-operated state regardless of an operation of the operating tool;
causes the hydraulic oil flowing from the pump to the steering actuator to be discharged to the tank via the relief valve to increase the torque of the engine when the increase instruction is inputted to the input unit and the steering is in a non-operated state; and
flows the hydraulic oil from the pump to the steering actuator when the increase instruction to increase the torque of the engine is inputted to the input unit and the steering is operated.

2. A hydraulic drive system to be applied to construction machinery, the construction machinery including: a steering for steering a wheel; a loading/unloading apparatus; and an operating tool for operating the loading/unloading apparatus,
the hydraulic drive system comprising:
a pump configured to be driven by an engine and discharge hydraulic oil;
a steering actuator connected to the pump and configured to operate based on the hydraulic oil from the pump;
a loading/unloading apparatus actuator connected to the pump in parallel with the steering actuator and configured to operate based on the hydraulic oil from the pump;
a drive device configured to control a flow of the hydraulic oil from the pump in accordance with an operation of the operating tool and an operation of the steering;
a relief valve configured to discharge the hydraulic oil from the pump to a tank when a discharge pressure of the pump has become a predetermined pressure or higher; and
an input unit for inputting an increase instruction to increase a torque of the engine, wherein
the drive device includes:
a priority valve configured to flow the hydraulic oil from the pump toward the loading/unloading apparatus actuator when the operating tool is operated, and flow the hydraulic oil from the pump toward the steering actuator when the steering is operated regardless of an operation of the operating tool;
a loading/unloading apparatus direction control valve configured to flow the hydraulic oil flowing toward the loading/unloading apparatus actuator to at least one of the loading/unloading apparatus actuator and the tank in accordance with an operation of the operating tool;
a steering direction control valve configured to flow the hydraulic oil toward the steering actuator or block a flow of the hydraulic oil in accordance with an operation of the steering; and
a direction switching valve provided downstream from the priority valve and configured to switch a flow direction of the hydraulic oil flowing from the pump toward the loading/unloading apparatus actuator, such that the hydraulic oil is directed to the relief valve, and
the drive device causes the hydraulic oil to be discharged from the pump to the tank via the relief valve to increase the torque of the engine when the increase instruction is inputted to the input unit and the steering is in a non-operated state.

3. The hydraulic drive system according to claim 2, wherein the direction switching valve is provided between the priority valve and the loading/unloading apparatus direction control valve.

4. The hydraulic drive system according to claim 2, wherein
the direction switching valve flows the hydraulic oil from the pump to the relief valve when the increase instruction to increase the torque of the engine is inputted to the input unit and the steering is in a non-operated state, and
the priority valve flows the hydraulic oil from the pump toward the steering actuator when the increase instruction to increase the torque of the engine is inputted and the steering is in an operated state regardless of an operation of the operating tool.

5. A hydraulic drive system to be applied to construction machinery, the construction machinery including: a steering for steering a wheel; a loading/unloading apparatus; and an operating tool for operating the loading/unloading apparatus,
the hydraulic drive system comprising:
a pump configured to be driven by an engine and discharge hydraulic oil;
a steering actuator connected to the pump and configured to operate based on the hydraulic oil from the pump;
a loading/unloading apparatus actuator connected to the pump in parallel with the steering actuator and configured to operate based on the hydraulic oil from the pump;
a drive device configured to control a flow of the hydraulic oil from the pump in accordance with an operation of the operating tool and an operation of the steering;
a relief valve configured to discharge the hydraulic oil from the pump to a tank when a discharge pressure of the pump has become a predetermined pressure or higher; and
an input unit for inputting an increase instruction to increase a torque of the engine, wherein
the drive device includes:
a meter-in compensator configured to flow the hydraulic oil from the pump toward the steering actuator when the steering is operated;
a bleed-off compensator configured to flow the hydraulic oil from the pump toward the loading/unloading apparatus actuator, and blocks between the pump and the loading/unloading apparatus actuator when the steering is operated;

a loading/unloading apparatus direction control valve configured to flow the hydraulic oil flowing toward the loading/unloading apparatus actuator to at least one of the loading/unloading apparatus actuator and the tank in accordance with an operation of the operating tool;

a steering direction control valve configured to flow the hydraulic oil toward the steering actuator or block a flow of the hydraulic oil in accordance with a state of operation of the steering; and solenoid switching valve configured to cause the bleed-off compensator to block between the pump and the loading/unloading apparatus actuator regardless of an operation of the steering, the drive device causes the hydraulic oil to be discharged from the pump to the tank via the relief valve to increase the torque of the engine when the increase instruction is inputted to the input unit and the steering is in a non-operated state, and the relief valve is configured to discharge the hydraulic oil flowing between the pump and the bleed-off compensator to the tank.

\* \* \* \* \*